United States Patent
Meersseman et al.

(10) Patent No.: US 12,325,259 B2
(45) Date of Patent: Jun. 10, 2025

(54) METHODS FOR MANUFACTURING DECORATIVE PANELS AND PANELS OBTAINABLE THEREBY

(71) Applicant: UNILIN, BVBA, Wielsbeke (BE)

(72) Inventors: Laurent Meersseman, Kortrijk (BE); Benjamin Clement, Waregem (BE)

(73) Assignee: UNILIN, BV, Wielsbeke (BE)

( * ) Notice: Subject to any disclaimer, the term of this patent is extended or adjusted under 35 U.S.C. 154(b) by 257 days.

(21) Appl. No.: 16/979,919

(22) PCT Filed: Mar. 14, 2019

(86) PCT No.: PCT/IB2019/052063
§ 371 (c)(1),
(2) Date: Sep. 11, 2020

(87) PCT Pub. No.: WO2019/175817
PCT Pub. Date: Sep. 19, 2019

(65) Prior Publication Data
US 2021/0008922 A1      Jan. 14, 2021

Related U.S. Application Data

(60) Provisional application No. 62/758,718, filed on Nov. 12, 2018, provisional application No. 62/743,029, (Continued)

(51) Int. Cl.
*B44C 3/02* (2006.01)
*B29C 64/112* (2017.01)
(Continued)

(52) U.S. Cl.
CPC ............ *B44C 3/025* (2013.01); *B29C 64/112* (2017.08); *B29C 64/393* (2017.08); *B33Y 10/00* (2014.12);
(Continued)

(58) Field of Classification Search
CPC ..................................................... B29C 64/112
See application file for complete search history.

(56) References Cited

U.S. PATENT DOCUMENTS 8,328,303 B2 * 12/2012 Frati .................... B41M 5/0076
347/1
8,465,804 B2    6/2013 Provoost et al.
(Continued)

FOREIGN PATENT DOCUMENTS

DE         3334921 A1    4/1985
DE    102009044802 A1   12/2011
(Continued)

OTHER PUBLICATIONS

Machine Translation of Von Aufschnaiter. (Year: 2010).*
(Continued)

*Primary Examiner* — Andrew L Swanson
(74) *Attorney, Agent, or Firm* — Workman Nydegger (57) ABSTRACT

Method for manufacturing decorative panels, where the panel includes a panel substrate material and a top decorative layer. The method includes applying the top decorative layer to the panel substrate material at least through additive manufacturing techniques, more particularly through material jetting. The process further concerns panels obtained or obtainable through such method.

18 Claims, 5 Drawing Sheets

Related U.S. Application Data filed on Oct. 9, 2018, provisional application No. 62/642,670, filed on Mar. 14, 2018.

(51) Int. Cl.
| | | |
|---|---|---|
| *B29C 64/393* | (2017.01) | |
| *B33Y 10/00* | (2015.01) | |
| *B33Y 50/02* | (2015.01) | |
| *B33Y 80/00* | (2015.01) | |
| *B44C 5/04* | (2006.01) | |
| *B29K 511/14* | (2006.01) | |

(52) U.S. Cl.
CPC .............. *B33Y 50/02* (2014.12); *B33Y 80/00* (2014.12); *B44C 5/043* (2013.01); *B29K 2511/14* (2013.01)

(56) References Cited

U.S. PATENT DOCUMENTS

| | | | | |
|---|---|---|---|---|
| 2005/0074596 | A1* | 4/2005 | Nielsen | B29C 64/40 700/98 |
| 2008/0233302 | A1* | 9/2008 | Elsner | B33Y 70/00 427/421.1 |
| 2009/0252925 | A1* | 10/2009 | Provoost | B44C 3/025 428/151 |
| 2010/0015408 | A1* | 1/2010 | Fong | B33Y 70/00 428/195.1 |
| 2014/0272334 | A1 | 9/2014 | Riebel et al. | |
| 2015/0030817 | A1* | 1/2015 | Wiegelmann | B44C 1/228 427/256 |
| 2016/0002468 | A1* | 1/2016 | Heikkila | B27N 5/00 524/13 |
| 2016/0145452 | A1* | 5/2016 | Fong | C09D 11/30 524/521 |
| 2016/0263829 | A1* | 9/2016 | Okamoto | B29C 64/165 |
| 2017/0120520 | A1* | 5/2017 | Miller | B29C 64/209 |
| 2017/0151714 | A1* | 6/2017 | McGee | B29C 64/118 |
| 2018/0229427 | A1* | 8/2018 | Ochi | B33Y 30/00 |
| 2018/0370147 | A1* | 12/2018 | Peter | B29C 64/393 |

FOREIGN PATENT DOCUMENTS

| | | | |
|---|---|---|---|
| DE | 102010036454 A1 | 1/2012 | |
| EP | 2189272 A2 | 5/2010 | |
| EP | 2873535 A1 | 5/2015 | |
| EP | 2189272 B1 * | 12/2016 | ............ B28B 1/001 |
| RU | 2592342 C1 * | 7/2016 | |
| WO | 0196689 A1 | 12/2001 | |
| WO | 03095202 A1 | 11/2003 | |
| WO | 2008148771 A1 | 12/2008 | |
| WO | 2009080813 A1 | 7/2009 | |

OTHER PUBLICATIONS

Machine Translation of Fomakhin (RU2592342C1), 2016 (generated Aug. 14, 2024), Espacenet (Year: 2016).*
International Search Report and Written Opinion in corresponding PCT Application No. PCT/IB2019/052063, dated Sep. 27, 2019.

* cited by examiner

METHODS FOR MANUFACTURING DECORATIVE PANELS AND PANELS OBTAINABLE THEREBY

This invention relates to methods for manufacturing decorative panels, as well as to panels obtained or obtainable with such methods.

More particularly, the invention relates to a method for manufacturing decorative panels of the type having a laminated structure, namely with at least a substrate material and a provided thereon top decorative layer.

BACKGROUND OF THE INVENTION

Such panels, in particular panels having a top decorative layer on the basis of synthetic material, e.g. on the basis of thermo-hardening material, such as melamine or another thermo-hardening amino resin, are known as such, for example, from the patent documents WO 03/095202, EP 1 290 290, DE 33 34 921 A1, WO 2008/148771 and WO 2009/080813. From the aforementioned patent documents, various techniques are known for manufacturing such laminate panels. Document EP 1 290 290 describes a wide spread method which is based on the traditional DPL (Direct Pressure Laminate) technique for manufacturing laminate panels comprising at least a substrate material and a top decorative layer. Such technique comprises at least the following steps:
- the step of printing a decor paper;
- the step of composing a stack to be pressed from a substrate material, the aforementioned decor paper and one or more layers of synthetic material for forming a transparent layer above said decor paper; and
- the step of hot-pressing said stack.

The particularity of a DPL technique is that the top layer or laminate layer is formed by consolidating at least the decor paper and the one or more layers of synthetic material. Consolidating comprises at least a hardening or cross-linking of the thermo-hardening synthetic material. At the same time, namely, by means of one and the same press treatment, this laminate layer is attached to the substrate material. During this press treatment, by means of a structured press element a relief can be formed in the surface of the laminate panel.

Mass producing decorative panels in accordance with the techniques of the prior art requires high investments in machinery, tooling and inventory. Further these production techniques consume a large amount of energy, often lead to obsolete stock and other scrap and waste.

SUMMARY OF THE INVENTION

The present invention aims at alternative methods for manufacturing decorative panels with a laminated structure which, according to various independent aspects and possible preferred embodiments thereof, offers advantages in respect to the state of the art.

Independent aspects and preferred embodiments of the invention are listed in the appended claims.

According to its first independent aspect, the present invention relates to a method for manufacturing decorative panels, wherein the panel comprises a panel substrate material and a top decorative layer, wherein the method comprises at least the following steps:
- the step of providing a panel substrate material;
- the step of applying said top decorative layer to said panel substrate material at least through one or more additive manufacturing technique, more particularly at least through material jetting.

Preferably said additive manufacturing technique is at least applied for creating a structured surface on said panel substrate material. The additive manufacturing technique is hence preferably applied for depositing relief forming material in a controlled manner, wherein the amount of deposited relief forming material is varied in accordance with a predetermined relief pattern to be obtained. The obtained structured layer may be positioned underneath a printed decorative pattern in which case an opaque material may be used for the relief forming material and/or be positioned on top of a printed decorative pattern, in which case a translucent or transparent material may be used for the relief forming material. The structured layer may also be build up from several differently colored relief forming materials, such that this structured layer also forms the decoration.

Additive manufacturing is today mainly used for prototyping, tooling and the production of lightweight and/or complex parts, for e.g. aerospace or medical applications. As is generally known in the field of production engineering, additive manufacturing techniques build up structural objects or structural parts of an object piece-by-piece, line-by-line, layer-by-layer, and so on, preferably on the basis of digital information concerning the part or object to be obtained. The present application aims at a more fluent mass production of decorative panels, and offers through its several independent aspects solutions for doing so using additive manufacturing for building the top decorative layer. Preferably the technique of material jetting is applied, wherein droplets of material are selectively deposited on a panel substrate material. The material to be jetted may be polymers or waxes, and may comprise solid filling materials, such as chalk, sand, wood dust, bamboo dust and so on.

The various independent aspects express the inventors' multiple endeavors to economically apply additive manufacturing for building up the top decorative layer. The inventor has split up the build up of the top decorative layer in sublayers and has realized that for each sublayer the additive manufacturing technique used could be optimized for maximum efficiency, to reach the desired functionality, e.g. sound dampening, abrasion resistance, stain resistance, impact resistance, antistatic behavior, light fastness, water proofness, and the desired visual aspect of the respective layer. The inventor found that such optimization could be reached by using particular raw material chemistry and/or by using particular material application techniques. By doing so, the inventor succeeded in defining a process that can be run continuously in a single pass mode, and which is economical for mass production.

According to its second independent aspect, the present invention relates to a method for manufacturing decorative panels, wherein the method comprises at least the following steps:
- the step of providing a panel substrate material;
- the step of depositing relief forming material on the substrate material with a first deposition device;
- the step of depositing decor forming material on the substrate material with a second deposition device;

wherein at least the step of depositing relief forming material and the step of depositing decor forming material are performed in a single movement of the panel substrate material relative to said first and second deposition device. It is clear that this second aspect may or may not show the features of the first independent aspect. Preferably, it is the panel substrate material that moves with relation to the respective deposition devices, while one or more or all of the deposition devices are stationary. Preferably one or more or all of the deposition devices extend transversely, preferably perpendicularly, over the path of the moving panel substrate material. Preferably the deposition devices have such a width that they can deposit material over the entire width of the moving panel substrate material while being stationary. Preferably the moving panel material is oriented with its surface to be decorated upwards and/or with its length direction in the direction of movement.

Preferably the panel substrate material is provided in a shape having at least the width, or about the width, of the finally to be obtained decorative panel. On the one hand such embodiment dramatically lowers the complexity of a manufacturing line. On the other hand the panel substrate material may be provided in a completely finished condition, with the exception of the top decorative layer to be provided. Such finished condition may for example comprise the presence of mechanical coupling means at at least one pair of opposite edges and/or the presence of a coating at the bottom side of the panel substrate material, for example a coating which is at least water resistant or water tight or even vapor tight and/or the presence of a sound dampening layer at the bottom side of the panel.

The inventors insight that additive manufacturing techniques could be practiced in a continuous production process opens up a variety of design options for an industrial manufacturing process. Contrary to the state of the art processes, wherein depositing devices perform reciprocating through-and-fro movements over an object in standstill, the inventor has realized, that, in the case of the building up a top decorative layer on a panel substrate material, it may be beneficial to leave this consensus in the state of the art behind. The inventor has realized that by positioning depositing device one after the other on a continuous line offers the desired flexibility to change the applied raw material, the size of the deposited material, and other properties in accordance with the layer to be deposited. Hence also the requirements for the deposition device may be adapted to the required needs for a particular layer in the top decorative layer, whereas the processes of the state of the art only work with one type of raw material and one deposition device.

It is clear that said relief forming material is preferably deposited such that a predetermined relief or structure is build up. The relief forming material is preferably a polymer, such as polyurethane (PU), polyvinylchloride (PVC), polyethylene (PE), polyethyleneterephthalate (PET), polypropylene (PP), acrylonytril butadiene styrene (ABS), nylon (polyamide, PA), polytetrafluoroethylene (PTFE) or polyacrylate. Preferably, the relief forming material is highly filled, i.e. comprise at least 30 weight percent of a filler material. Alternatively the filler material may be added into a layer of already deposited relief forming material in an additional step before said step of depositing decor forming material. Said filler material may be sand, chalk, talcum, or others. The particle size of the filler material, whether deposited together with the relief forming material or not, is preferably larger than 10 micrometer.

Preferably said step of depositing relief forming material comprises depositing a layer with a thickness at the thickest spots of at least 250 micrometer. The inventor has noticed that a thickness between 250 and 1000 micrometer is sufficient to enable a lifelike imitation of standard decorations, such as wood and stone imitating decorations.

Preferably, said first deposition device is a digitally controlled deposition device which allows to apply a spatially diversified amount of relief forming material, or, in other words, allows to control the amount of relief forming material to be deposited on a particular area of the relative surface. Preferably said first deposition device is a valvejet device, piezoneedle device, and/or a deposition device allowing a maximum resolution of 100 dpi. For example, a definition as low as 28 dpi may suffice.

It is further clear that said decor forming material is preferably a liquid ink, such as a pigment containing water-based ink or UV curing ink. These inks may be comprised in an inkset which at least comprises CMYK (Cyan Magenta Yellow and Key/Black) inks.

In general, it is preferred that, downstream along the manufacturing line the deposition devices are such that their resolution increases while the volume of material deposited or ejected per unit of time decreases.

According to its third independent aspect, which may or may not be combined with the abovementioned first and/or second aspect, the invention relates to a method for manufacturing decorative panels, wherein the method comprises at least the following steps:
  the step of providing a panel substrate material;
  the step of depositing relief forming material on the substrate material with a first deposition device;
  the step of depositing decor forming material on the substrate material with a second deposition device;
wherein both said first and second deposition device comprise nozzles projecting the respective material to the substrate material, and in that the nozzles of said first deposition device are at a larger distance to the surface of the substrate material, than the nozzles of said second deposition device. The present independent aspect is another example of the ability of tuning a manufacturing method that uses additive manufacturing into an industrial reliable manufacturing method for decorative panels. In general, along a continuous manufacturing line, such as the one described above in the second independent aspect, the distance between the nozzles of two or more or each of the deposition devices and the surface of the substrate material may be different and/or automatically variable, e.g. in accordance with the material lay-up of preceding deposition devices and/or the final decorative panel geometry to be obtained. For example, when two or more deposition devices are used to deposit relief forming material, the nozzles of one or more devices downstream from a particular location along the line may be at a larger distance from the surface of the panel substrate material than the nozzles of one or more devices upstream from the same location along the line.

In the light of what is generally known in the field of production engineering, it is clear that according to this third aspect of the invention the relief forming material may be deposited by means of one or more additive manufacturing techniques as it is a structural part of an object, while the decor forming material may be deposited by techniques other than additive manufacturing, such as by means of a decorative printing technique, such as inkjet printing. It is of course not excluded to deposit the decor forming material by means of one or more additive manufacturing techniques.

According to a special embodiment the distance between the nozzles of the second deposition device and the surface of the panel substrate material may be steered or controlled in accordance with a relief or structure obtained by means of the deposited relief forming material.

According to its fourth independent aspect, which may or may not be combined with the above mentioned first, second and/or third aspect, the present invention relates to a method for manufacturing decorative panels, wherein the method comprises at least the following steps:

the step of providing a panel substrate material;

the step of depositing relief forming material on the substrate material with a first deposition device;

the step of depositing decor forming material on the substrate material with a second deposition device;

wherein said first deposition device deposits relief forming material having a particle size larger than 20 micrometer and/or with a drop volume larger than 100 picoliter, and said second deposition device deposits decor forming material with a drop volume smaller than 50 picoliter; and/or said first deposition device deposits relief forming material at a rate of 300 grams per square meter or more, while said second deposition device deposits decor forming material at a rate of 20 grams per square meter or below; and/or said first deposition device comprises nozzles having a diameter of above 250 micrometer, while said second deposition device comprises nozzles having a diameter of below 50 micrometer.

As afore stated, the inventor has found that, in order to make additive manufacturing economically feasible, it may be desirable to customize the material to be applied to the final function the respective sublayer will have in the top decorative layer. According to the present aspect a first deposition device for the application of relief forming material deposits relatively large material of preferably essentially solid matter, e.g. highly filled polymer, while a second deposition device, in this case for the application of decor forming material such as ink, deposits smaller droplets of preferably essentially liquid matter, e.g. of pigment containing fluid inks. In the light of what is generally known in the field of production engineering, it is clear that according to this fourth aspect of the invention the relief forming material may be deposited by means of one or more additive manufacturing techniques as it is a structural part of an object, while the decor forming material may be deposited by techniques other than additive manufacturing, such as by means of a decorative printing technique, such as inkjet printing. It is of course not excluded to deposit the decor forming material by means of one or more additive manufacturing techniques.

According to its fifth independent aspect, which may or may not be combined with the above mentioned first, second, third and/or fourth aspect, the invention relates to a method for manufacturing decorative panels, wherein the method comprises at least the following steps:

the step of providing a panel substrate material;

the step of depositing relief forming material on the substrate material with a first deposition device;

the step of depositing decor forming material on the substrate material with a second deposition device;

wherein said first deposition device deposits relief forming material at a resolution of below 100 dpi, while said second deposition device deposits decor forming material at a resolution above 200 dpi. The present fifth independent aspect of the invention concerns another important desirable measure when tuning an additive manufacturing technique to a reliable and feasible industrial manufacturing process. The fifth aspect results from the inventor's insight that a relief structure which is underneath a decoration may be relatively coarse without minimizing the natural looks thereof. In the light of what is generally known in the field of production engineering, it is clear that according to this fifth aspect of the invention the relief forming material may be deposited by means of one or more additive manufacturing techniques as it is a structural part of an object, while the decor forming material may be deposited by techniques other than additive manufacturing, such as by means of a decorative printing technique, such as inkjet printing. It is of course not excluded to deposit the decor forming material by means of one or more additive manufacturing techniques.

According to its sixth independent aspect, which may or may not be combined with the above mentioned first, second, third, fourth and/or fifth aspect, the present invention relates to a method for manufacturing decorative panels, whether or not in accordance with any of the preceding claims, wherein the method comprises at least the following steps:

the step of providing a panel substrate material;

the step of depositing background forming material on the panel substrate material;

the step of depositing decor forming material on the panel substrate material;

wherein the method further comprises the step of depositing hard particles on the background forming material and/or the step of incorporating hard particles in the background forming material. The inventor has recognized that hard particles, such as particles of aluminiumoxide, siliconcarbide, titaniumcarbide or diamond, may be added underneath a decoration, and above a background layer. In case of excessive wear which proceeds through the decoration, the background layer will be visible and protected by the hard particles, such that the wear marks will be better acceptable to a consumer. According to a deviating variant an abrasion resistant lacquer may be provided in between the background forming material and the decor forming material.

Preferably the method further comprises the step of depositing hard particles at a position above the decor forming material and/or the step of incorporating hard particles in the decor forming material. Preferably, the hard particles deposited in and/or above the decor forming material are siliconcarbide or aluminiumoxide particles. Preferably these hard particles have an average particle size of 120 micrometer or less, while the hard particles which are deposited on or in the background forming material are larger, for example with an average particle size of more than 150 micrometer.

Said step of depositing background forming material is preferably executed after a step of depositing relief forming material on the panel substrate material has already been executed. Said background forming material may be an ink, preferably a pigment containing ink, which is applied using digital printing techniques, such as by means of valvejet or inkjet, and then preferably cured. Also the decor forming material, as stated above, may be a pigment containing ink, which is applied using digital printing, preferably inkjet printing, preferably drop-on-demand. Preferably, the digital printing technique used for depositing background forming material attains a lower maximum resolution than the digital printing technique used for depositing decor forming material. According to a variant the background is identical to the decoration.

According to its seventh independent aspect, which may or may not be combined with the above mentioned first, second, third, fourth, fifth and/or sixth aspect, the present invention relates to a method for manufacturing decorative panels, whether or not in accordance with any of the preceding claims, wherein the method comprises at least the following steps:

the step of providing a panel substrate material;
the step of depositing decor forming material on the substrate material;
the step of depositing a clear coating material on the substrate material;

wherein said clear coating material is digitally applied with a resolution above 300 dpi, preferably above 900 dpi. Preferably the method further comprises the step of curing said clear coating material, wherein said curing may be controlled digitally. Said digitally controlled curing may comprise applying different pinning and cure settings to said clear coating material. The curing may for example be a thermal curing or a radiation curing, such as a UV and/or excimer curing. Applying the clear coating material digitally allows for the application of a microstructure and/or a variable gloss to the surface of the decorative panel.

According to a preferred embodiment, said clear coating material comprises a matting agent.

According to its eighth independent aspect, the present invention relates to a method for manufacturing decorative panels, wherein the method comprises at least the following steps:

the step of providing a panel substrate material;
the step of depositing relief forming material on said panel substrate material from a suspension, wherein said suspension comprises particles and at least one binder.

Said relief forming material is preferably deposited from the suspension at least through one or more additive manufacturing techniques, more particularly through material jetting. The suspension is preferably deposited by pressing it through one or more nozzles, for example by means of gravity, extrusion or with the aid of compressed air.

Said particles may comprise at least wood fibers. Preferably, said particles comprise at least wood dust.

Preferably, the particles have an average particle size equal to or smaller than 1 millimeter, such as equal to or smaller than 0.75 millimeter, for example equal to or smaller than 0.5 millimeter, more preferably equal to or smaller than 0.3 millimeter. For the skilled person it is clear that the average particle size may be determined by means of sieve analysis or by means of laser diffraction. Preferably, the average particle size is determined by means of sieve analysis. Sieve analysis uses a number of sieves with a different grid, defining different sizes of the apertures in the sieve mesh. Preferably a stack of sieves is made, with the aperture size decreasing from the top to the bottom. For example, for particles with a particle size equal to or smaller than 1 millimeter will pass the apertures of the sieve with apertures of 1.1 millimeter, but will not pass the sieve with apertures of 0.9 millimeter.

The binder is preferably one or more of carboxymethyl cellulose (CMC), for example sodium carboxymethyl cellulose, or ureumformaldehyde (UF), melamineformaldehyde (MF), starch, polyvinylalcohol (PVA) or polyvinylacetate (PVAc).

According to a preferred embodiment, the particles and the binder are present in the suspension in a particle/binder ratio of 40/60 to 95/5, preferably based on the weight of the particles and the weight of the binder, for example in a ratio of 50/50 to 90/10, such as a ratio of 60/40 to 80/20. Preferably, the particle/binder ratio is 80/20. The particle/binder ratio will depend on the average particle size and on the chemical composition of the binder. The function of the binder is to hold the particles together to deposit the relief forming material that will be less prone to deterioration over time and to provide sufficient adhesion to the provided substrate.

The suspension may further comprise one or more additives, such as a stabilizer, for example an UV stabilizer, or an adhesive, a crosslinking agent, a curing agent, a photoinitiator, or a colorant.

In a preferred embodiment, the method further comprises the step of drying and/or curing the deposited relief forming material. The drying and/or curing may be a thermal drying and/or cure, and/or an IR drying and/or cure, and/or an UV drying and/or cure. Whether thermal, IR, or UV drying and/or cure is used may depend on the composition of the suspension. The step of drying and/or cure may have a duration of minutes to one week, for example from 5 minutes to 5 days, such as from 1 hour to 3 days, for example from 12 hours to 2 days. The duration of the drying and/or cure depends on the composition of the suspension, and the thickness and relief of the deposited relief forming material.

With the method described in this eighth aspect of the invention, a relief forming material is deposited. The method according to the eighth aspect of the invention may be used as the step of depositing relief forming material as mentioned in the first to the fifth aspect of the present invention and in their preferred embodiments and special embodiments.

In a further step according to the method, a decor forming material may be deposited, for example by any one of techniques described above in the first to the seventh aspect of the present invention and in their preferred embodiments and special embodiments to deposit a decor forming material. The relief forming material may in itself have a decorative aspect.

According to its ninth independent aspect, the present invention relates to a method for manufacturing decorative panels, wherein the method comprises at least the following steps:

the step of providing a panel substrate material;
the step of depositing relief forming material on said panel substrate material, wherein said relief forming material is deposited from a liquid by means of pressure waves.

Preferably, said pressure waves are sound waves. Said sound waves may be infrasonic, hearable to the human air, or ultrasonic. Preferably, said sound waves are ultrasonic sound waves. Ultrasonic sound waves have a frequency higher than 20 kilohertz (kHz).

The pressure waves may be used in for example acoustic jet printing. Acoustic jet printing is an additive manufacturing technique that uses pressure waves, for example sound waves, to generate acoustic forces. Said acoustic forces may form droplets from liquids. The liquids may have a viscosity within a very broad range. By means of acoustic jet printing droplets can be deposited in a very controlled way.

Preferably, the liquid may comprise at least one additive. Preferably, the additive may be an adhesive, a crosslinking agent, a curing agent, a photoinitiator, or a colorant.

At least one additive may be deposited onto the deposited relief forming material. Said additive may be deposited by means of additive manufacturing techniques, for example by jetting, such as material jetting. Preferably, said additive is an adhesive such as a glue, or is a crosslinking agent, a curing agent, or a photoinitiator.

A curing step may be performed after said step of deposition of the relief forming material from a liquid by means of pressure waves. The curing step may be a thermal cure, a reactive cure or a UV cure. Whether thermal, reactive or UV cure is preferred will depend on the composition of the relief forming material and on the optionally applied additive.

With the method described in this ninth aspect of the invention, a relief forming material is deposited. The method according to the ninth aspect of the invention may be used as the step of depositing relief forming material as mentioned in the first to the fifth, or in the eighth aspect of the present invention and in their preferred embodiments and special embodiments.

In a further step according to the method, a decor forming material may be deposited, for example by any one of techniques described above in the first to the seventh aspect of the present invention and in their preferred embodiments and special embodiments to deposit a decor forming material. The relief forming material may in itself have a decorative aspect.

According to its tenth independent aspect, the present invention relates to a method for manufacturing decorative panels, wherein said decorative panel comprises a decorative surface having one or more relieved features, wherein the method comprises at least the following steps:
- the step of providing a panel substrate material;
- the step of depositing contour forming material on the substrate material, wherein said contour forming material at least partially defines the contours of one or more of said relieved features;
- the step of providing filling-up material at least within one or more of said contours.

Said contour forming material is preferably deposited at least through one or more additive manufacturing techniques, more particularly through material jetting, but may also be deposited by one or more scattering or coating techniques.

The contour forming material is preferably a polymeric material, for example a photopolymer, preferably with a curing agent added, or a polymer with a photoinitiator and, preferably, a curing agent added. Addition of a curing agent, a photoinitiator and/or a curing agent may allow for improved curing and bonding with the filling-up material to form a macrostructure comprising one or more relieved features.

Said filling-up material is preferably deposited by using traditional coating techniques, such as powder coating or scattering, or by using other techniques which are not applied layer-by-layer, piece-by-piece, line-by-line, and which are preferably not based on digital information, but rather are analogue coating techniques. As an alternative the filling-up material may also be deposited by one or more additive manufacturing techniques, such as material jetting. Preferably, the filling-up material may be selected from wood, cellulose, chalk, or may comprise wood, cellulose, chalk or calcium carbonate, and is preferably in powder form.

In a preferred embodiment, the method further comprises the step of depositing an adhesive within one or more of said contours, preferably with part or all of the relevant filling-up material already present within the same contours. The adhesive may be deposited by means of one or more additive manufacturing techniques, for example by jetting, such as material jetting. The adhesive is preferably a glue, or another polymeric material, preferably with one or more functional groups chosen in function of the composition of the filling-up material and/or the contour forming material, and may further comprise one or more additives selected from a crosslinking agent, a curing agent, a photoinitiator, a pigment, and the like, which preferably contribute to an enhanced curing of the filling-up material.

Preferably, after deposition of said adhesive and said filling-up material, the method comprises the step of curing said filling-up material and/or said adhesive. The curing may be a thermal curing, a reactive curing or an UV curing. Whether thermal or reactive curing is used may depend on the adhesive. Upon curing, said adhesive may allow for mutual bonding of the filling-up material to form a solid layer, and/or said adhesive may allow for a bond being formed between said filling-up material and said contour forming material, and/or between said filling-up material and said panel substrate material during the step of curing.

Preferably, upon completion or partial completion of the curing, the method further comprises the step of removing unbound or loose filling-up material and/or adhesive. Said unbound filling-up material and/or adhesive may be removed by means of suctioning, brushing, rinsing, and/or any combination of the foregoing.

It is clear that a same panel may comprise relieved features of two or more differing heights, which each have been obtained by depositing contour forming material and filling-up material in accordance with the tenth aspect of the invention. Preferably, in such case, the contour forming material and/or the filling up material is deposited or built up layer-by-layer, and wherein the number and/or the height of the layers is varied from one relieved feature to be obtained to the other. It is clear that intermediate steps may be performed wherein adhesive is deposited within one or more of said contours and/or wherein said filling-up material or the possible adhesive is cured.

Such embodiment can for example be obtained in accordance with a particular possibility of the above mentioned preferred embodiment, wherein the method further comprises the step of depositing an adhesive within one or more of said contours. In such case, the steps of providing filling-up material at least within one or more of said contours, depositing an adhesive within one or more of said contours, curing said filling-up material and/or said adhesive, and optionally, upon completion or partial completion of the curing, removing unbound or loose filling-up material and/or adhesive, may be repeated at least one time. It is clear that in the second or subsequent steps, the adhesive may be selectively applied only with the contours where bonding of the filling-up material is required, which may lead to a relief that is further enhanced compared to the relief obtained when the steps would be performed only once.

With the method described in this tenth aspect of the invention, a macrostructure may be obtained, comprising one or a plurality of relieved features. In a further step according to the method, a decor forming material may be deposited by any one of the techniques described above in the first to the seventh aspect of the present invention, either before or after the deposition of the contour forming material and/or filling-up material. The contour forming and/or filling-up material may in itself have a decorative aspect.

According to its eleventh independent aspect, the present invention relates to a method for manufacturing decorative panels, wherein the method comprises at least the following steps:
- the step of providing a panel substrate material;
- the step of providing a mold;
- the step of providing a flexible material layer to said mold;
- the step of shaping said flexible material layer in said mold to form a molded relief material;
- the step of adhering said molded relief material to said substrate, wherein said mold is an adaptive mold. With an adaptive mold it is meant that the shape of the mold can be varied or changed easily, for example after every use. The advantage of an adaptive mold is that the mold can be used to shape several different molded relief materials. This may reduce the number of molds required to provide a certain number of designs or shapes. The mold may be reused and is easily changed in accordance with the relief to be obtained.

According to a preferred embodiment, the method further comprises the step of shaping said mold. Said step of shaping the mold may be performed prior to the step of providing a flexible material layer to the mold. Alternatively, the step of shaping the mold may be performed after the step of providing a flexible material layer to the mold and prior to the step of shaping the flexible material layer in the mold. Preferably, the step of shaping the mold is performed together with the step of shaping the flexible material layer in the mold.

Preferably the adaptive mold may comprise of a plurality of pins located under the mold surface. The mold surface is the surface of the mold that comes into contact with the flexible material layer. The height of the pins define the shape of the molding surface.

Preferably, said height of the pins is adaptable for each pin individually. Preferably the pins may be spaced apart from 0.02 millimeter to 5 centimeter, for example from 0.1 millimeter to 1 centimeter, such as from 0.2 millimeter to 1 millimeter. The molding surface may be a polymer, for example a thermoform polymer. Said thermoform polymer may be a shape memory polymer, wherein the memorized shape of the shape memory polymer may be the flat shape that is obtained when all pins have the same height.

Preferably, said step of shaping the flexible material layer comprises at least a forming step and a form fixation step. During said forming step the flexible material may receive a shape, preferably a relief. During said form fixation step, the shape, preferably the relief, of the flexible material may be fixated, so that a molded relief material is obtained.

Preferably, the flexible material layer comprises at least one polymer, which may be a polyolefin, for example polypropylene (PP) or polyethylene (PE), or may be polyurethane (PU), polyvinylchloride (PVC), polyethyleneterephthalate (PET), acrylonytril butadiene styrene (ABS), nylon, polytetrafluoroethylene (PTFE) or polyacrylate.

The flexible material layer may comprise at least one additive. Preferably said additive may be, without being limited hereto, a crosslinking agent, a curing agent, a photoinitiator, a stabilizer, a softening agent or a colorant.

The flexible material layer may comprise one or more additional layers applied on at least one side of the flexible material layer prior to the step of shaping the flexible material layer. Alternatively, said additional layer may be applied to the molded relief material after the step of shaping the flexible material into the molded relief material. The additional layer may be an adhesive, such as a glue. The additional layer may be applied on the side of the flexible material layer that will, during said step of adhering the molded relief material to the substrate, be adhered to the provided substrate.

Preferably, at least said forming step is a thermal step. Said form fixation step may be a thermal step. Said shaping step, comprising a forming step and a form fixation step, may be a thermal step. Preferably, during said thermal step at least the mold surface is heated and the flexible material layer is activated by means of the energy from the heating of at least the mold surface. When applied during the forming step, the activated flexible material layer will be shaped according to the shape of the adaptive mold.

Preferably, at least said form fixation step is a radiation based step. Said forming step may be a radiation based step. Said shaping step, comprising a forming step and a form fixation step, may be a radiation based step. Preferably, during said radiation based step, radiation is applied to at least the flexible material layer. Preferably, said radiation is a UV radiation or an electron beam (EB) radiation. When applied during the form fixation step, the shaped flexible material layer will cure and will form a molded relief material.

The molded relief material is adhered to the provided substrate in said step of adhering. By adhering the molded relief material to the substrate, a macrostructure may be obtained. The molded relief material may be adhered to the substrate by means of heating, pressing, and/or gluing.

With the method described in this eleventh aspect of the invention, a macrostructure may be obtained, comprising one or a plurality of relieved features. The method according to the eleventh aspect of the invention may be used as the step of depositing relief forming material as mentioned in the first to the fifth, or the eighth to the ninth aspect according to the invention and in their preferred embodiments and special embodiments, and/or may be used as the step of obtaining one or a plurality of relieved features as mentioned in the tenth aspect according to the invention and in its preferred embodiments and special embodiments.

In a further step according to the method, a decor forming material may be deposited, for example by any one of techniques described above in the first to the seventh aspect according to the invention and in their preferred embodiments and their special embodiments to deposit a decor forming material. The molded relief material may in itself have a decorative aspect.

According to its twelfth independent aspect, the present invention relates to a method for manufacturing decorative panels, wherein the method comprises at least the following steps:
the step of providing a panel substrate material;
the step of realizing a first material layer on the panel substrate material, wherein said first material layer has a digitally obtained surface structure;
the step of depositing relief forming material for forming a second material layer;
wherein the maximum depth of the relief features in said second material layer is smaller than the maximum depth of the relief features in said first material layer. Preferably the relief features in said first material layer form a macrostructure and the relief features in said second material layer form a microstructure.

For example, when the decorative panel is made of wood, a macrostructure may be one or more of beveled edges, scrapes, wood knots, or cracks, and a microstructure may be for example wood pores.

In a preferred embodiment, the first material layer comprises preferably at least one polymer, which may be a polyolefin, for example polypropylene (PP) or polyethylene (PE), or may be polyurethane (PU), polyvinylchloride (PVC), polyethyleneterephthalate (PET), acrylonytril butadiene styrene (ABS), nylon, polytetrafluoroethylene (PTFE) or polyacrylate.

Optionally, the material of the first material layer may comprise additives, such as a filler, which may be sand, chalk, talcum, or others.

According to a first embodiment, the first material layer may be deposited by means of one or more additive manufacturing techniques, for example through jetting, such as material jetting, or through digital deposition of material. For example, the first material layer may be obtained by means of a technique similar or the same as those described for the deposition of the relief forming material in any of the first till fifth aspect or any of the eighth till ninth aspect of the present invention or by means of a technique similar or the same as that described in the tenth aspect of the present invention for obtaining the relieved features or by means of a technique similar or the same as that described in the eleventh aspect of the present invention for obtaining the molded relief material.

According to a second embodiment, the first material layer may be deposited by means of a method other than an additive manufacturing technique. For example, said first material layer may be obtained through a method comprising at least the following steps:

the step of depositing a foamable or expandable material on the panel substrate material;

the step of activating said foamable or expandable material, wherein upon activating the foamable or expandable material is foamed or, respectively expanded, and, preferably, is cured at the same time or afterwards so as to form a relief Preferably, when said first material layer is deposited by means of depositing said foamable or expandable material that is activated to form a relief, it may comprise further additives such as a foaming agent, for example a surfactant or a blowing agent, which may be one or more of carbondioxide (preferably liquid), hydrocarbons, azodicarbonamide, hydrazine and other nitrogen-based molecules, or natriumbicarbonate. A hydrocarbon blowing agent may be pentane, isopentane or cyclopentane.

Preferably, when said first material layer is deposited by means of depositing said foamable or expandable material, said method further includes the step of depositing a reactive agent on the foamable or expandable material prior to the step of activating. Said reactive agent may be an inhibitor, such as a foam inhibitor or an expansion inhibitor, or may be a promotor, such as a crosslinker or a photoinitiator.

Preferably said reactive agent is deposited by means of printing, such as inkjet printing, or by another technique that is preferably not based on digital information, but rather are analogue coating techniques.

Preferably, said activating the foamable or expandable material includes one or more of heating, radiating, such as by IR, UV, LED, electron beam, or, lasering. Upon application of heat, radiation or laser light, the reactive agent allows for foaming or expansion of the foamable or expandable material, and, preferably, at the same time allows for the curing of the obtained foamed or expanded material such that a relief is formed.

When the reactive agent is a foam inhibitor, upon activation said foamable or expandable material will show reduced to substantially no foaming or expansion, and/or curing, at the areas where the reactive agent is present, wherein the other areas will show foaming and/or curing, hereby forming a relief.

When the reactive agent is a crosslinker or a photoinitiator, upon activation, said foamable or expandable material will show foaming or expansion, and/or curing, at the areas where the reactive agent is present, wherein the other areas will show substantially no foaming and/or curing, hereby forming a relief.

Differences in height of the relief may be obtained by varying the application of reactive agent to create a different foaming or expansion, and/or curing. For example differences in the relief may be obtained by varying the thickness of the reactive agent applied to the substrate, or by varying the surface area of the substrate to which the reactive agent is applied, or by varying the amount and/or type of reactive agent deposited.

Preferably, the method further comprises the step of removal of unreacted foamable or expandable material. Unreacted material is material that did not foam or expand, and/or cure as to form part of the relief. Removal may be performed by suctioning, rinsing or brushing.

According to a further embodiment, one or more intermediate layers may be deposited between said first material layer and said second material layer. Said intermediate layer may be one or more of a printed layer, such as a decor forming material layer, or may be an anti-abrasion layer.

According to some embodiments, the method may further comprise the step of depositing a first printing layer between the first material layer and the second material layer, wherein the first printing layer is realized at least through digital printing, preferably by inkjet printing.

According to some embodiments, the method may further comprise the step of depositing an anti-abrasion layer between said first material layer and said second material layer. The anti-abrasion layer may be deposited between the optional first printing layer and the second material layer. The anti-abrasion layer may be deposited between the first material layer and the optional first printing layer.

According to some embodiments, the method may further comprise the step of depositing a second printing layer between said optional first printing layer or said optional anti-abrasion layer and said second material layer, wherein said second printing layer is realized at least through digital printing, preferably by inkjet printing. The second printing layer may be deposited between the optional first printing layer and the second material layer. The second printing layer may be deposited between the optional anti-abrasion layer and the second material layer.

Preferably, when inkjet printing is used to deposit the first and/or second printing layer, one or more liquid inks may be used. Said liquid ink may be water-based ink, a UV curing ink, optionally comprising one or more pigments. Said liquid ink may be an cyan ink, a magenta ink, a yellow ink, or a key/black ink (CMYK inks). Preferably, when a UV curing ink is used, a UV curing step is preferably performed after the step of deposition of the print layer, or part thereof.

It is hence clear that in a preferred embodiment, at least two, such as three additional layers may be deposited. For example, a first printing layer, an anti-abrasion layer and a second printing layer may be deposited subsequently.

Preferably the anti-abrasion layer may comprise hard particles, for example siliconcarbide or aluminiumoxide. Preferably the hard particles may have an average particle size of 120 micrometer or less.

Preferably, when at least one printing layer is deposited, it has a resolution of above 300 dpi, more preferably above 900 dpi. Preferably, said first and second print layers are applied with a resolution above 300 dpi, preferably above 900 dpi. Preferably said second print layer has a higher resolution than said first print layer. For example the first print layer has a resolution lower than 600 dpi, while the second print layer has a resolution higher than 600 dpi, preferably 900 dpi or more.

In a further embodiment, a relief forming material is deposited, forming a second material layer. Preferably, the relief forming material may be deposited by means of one or more additive manufacturing techniques, more particularly through material jetting.

In general, it is remarked, that the additive manufacturing technique employed in some or all aspects of the invention is preferably applied for creating a structured surface on said panel substrate material. The sublayer having the structure, or being responsible for the final structure may be underneath the decoration and/or above the decoration. In the latter case the layer is preferably formed by said clear coating.

As above mentioned and in accordance with any or a plurality of the above mentioned independent aspects, said panel substrate material is preferably provided in the final shape, or about in the final shape.

As above mentioned and in accordance with any or a plurality of the above mentioned independent aspects, said panel substrate material comprises a uniformly colored top surface. Such top surface may be obtained in that the panel substrate material has been provided with a uniformly colored lacquer or other coating or with a uniformly colored paper, foil, or other sheet type material.

As above mentioned and in accordance with any or a plurality of the above mentioned independent aspects, said panel substrate material may comprise a flat top surface or a structured top surface. A structured top surface may for example include surface features imitating beveled edges or grout lines or distress marks, such as saw cuts and/or scraping paths.

As above mentioned and in accordance with any or a plurality of the above mentioned independent aspects, a relief forming material is applied which comprises a polymer filled with at least 30 wt % of filler materials.

In all independent aspects, the manufacturing is preferably executed on a continuous line. The width of the line preferably corresponds to the width of the decorative panel finally to be obtained. Preferably the width of the line is at least 150 mm. Preferably the panel is put through the line at a speed of at least 80 m/min. It is possible to reach speeds up to 150 m/min or more, for example by doubling the deposition devices and/or printing equipment.

According to all independent aspects separately or combined, and the preferred embodiments thereof, a step of packaging one or more decorative panels in a common packaging unit may be added to the method disclosed. The packaging may comprise a paper or cardboard based box and/or a wrapping foil. Preferably, the method includes the step of digitally printing on the packaging unit, for example at least an identification of the product, such as a tradename or trademark or a barcode or a QR code.

It is clear that the present invention, in accordance with an independent thirteenth aspect, also relates to a decorative panel obtained or obtainable by any or a plurality of the above mentioned aspects or preferred embodiments thereof. Further the invention, in accordance with an independent fourteenth aspect, which may be combined with the thirteenth aspect or not, relates to a decorative panel comprising a panel substrate material and a top decorative layer, wherein said top decorative layer at least comprises a background forming layer and a decor forming layer, wherein hard particles are available between the background forming layer and the decor forming layer. Preferably the surface of said background forming layer is structured, for example because a relief forming layer is available in said top decorative layer at a location underneath said background forming layer. Preferably hard particles are available on top of said decor forming layer and/or are incorporated in said decor forming layer. Preferably, said top decorative layer comprises a clear coat layer above said decor forming layer, wherein said clear coat layer may have a microstructure and/or multiple gloss levels.

Preferably, in accordance with any or a plurality of the above listed aspects and preferred embodiments thereof, the top decorative layer has a total thickness of between 0.1 and 1 millimeter, and even better between 0.3 and 0.8 millimeter, wherein 0.6 millimeter is a good value. This range of thickness provides for a sufficiently realistic structure, while obtaining a reliable, fluent and economically feasible manufacturing process, without creating obsolete stock and with minimized waste.

Where in the above the resolution of a deposition device is mentioned, reference is made to the resolution obtained with the device and panel at standstill, or the transversal resolution, namely the resolution transverse to the relative movement between panel substrate material and deposition device.

Furthermore, the particular features or characteristics of the above mentioned independent aspects of the invention and/or their respective preferred embodiments may be combined in any suitable manner in one or more embodiments, as would be apparent to one of ordinary skill in the art.

It is remarked that where in the above a CMYK set of inks or colorants is mentioned, use may also be made of an inkset at least comprising a red ink. Red inks are particularly useful in the case imitations of wood are aimed at. For example instead of CMYK, CRYK (cyan red yellow black) may be used, or a CMYK ink set may be supplemented with a red ink (CMYK+R). Further it is possible that the ink set or set of colorants is supplemented with light cyan, light magenta, light yellow and/or white and/or one or more spotcolors.

BRIEF DESCRIPTION OF THE DRAWINGS

With the aim of better describing the prior art as well as the invention, here below as examples without limitative character, some preferred embodiments are described with reference to the attached figures, wherein.

DETAILED DESCRIPTION OF THE INVENTION

The reference numbers used in the figures are partly defined in the claims.

Figure 1:
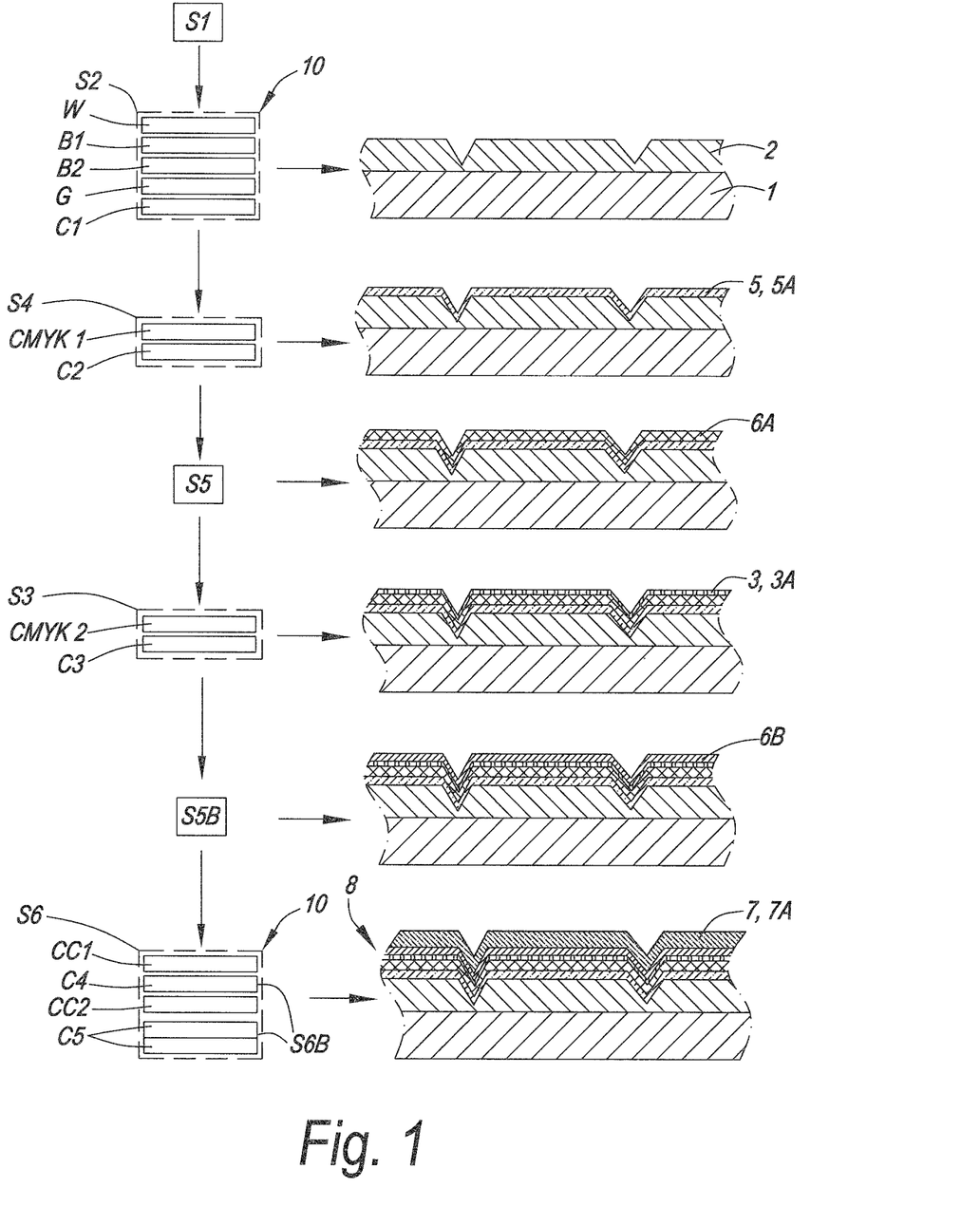
FIG. 1 schematically represents some steps in a method according to the invention for a potential product build-up.

FIG. 1 schematically represents possible steps in a method for manufacturing a decorative panel 8 in accordance with the invention. The exemplified method starts with providing the panel substrate material 1, preferably a HDF substrate material. The panel substrate material 1 may optionally be structured in a step S1 by milling, possibly cnc milling (computer numerically controlled), and/or laser machining. The method comprises the step S2 of depositing relief forming material 2, the step S4 of depositing background forming material 5, the step of depositing hard particles 6A, the step S3 of depositing decor forming material 3, the step of depositing hard particles 6B and the step of depositing clear coating material 7.

As aforementioned the method of FIG. 1 comprises the step S2 during which a relief forming material 2 is deposited. The relief forming material 2 comprises white, beige, brown and grey (W, B1, B2, G) relief forming material which are deposited subsequently and cured in a curing step C1. In step S2 a colored base structure, preferably a macrostructure, is created. The relief forming material may be a colored photopolymer including fillers, which may be jetted and/or deposited by scattering colored powder and jetting binder.

Next, in the example of FIG. 1, step S4 is performed during which a background forming material 5 is deposited as a first print layer or background forming layer 5A. In this case the background forming material is printed using CMYK (Cyan, Magenta, Yellow, Key-black) colors CMKB 1, optionally followed by a curing in a curing step C2. Such curing step may a thermal cure or a UV cure. Alternatively instead of CMYK colors, spot colors may be used. As is known in the art, spot colors are premixed colors which preferably appear in the design to be obtained.

On top of this background forming layer 5A a first anti-abrasion layer 6A is formed in the step S5. This is realized by applying mineral particles, for example by scattering Alox (Aluminiumoxide particles), by binder and powder jetting, or by using a piezo needle.

In a further process step S3, a decor forming material 3 is deposited to form a second print layer 3A. Also in this case CMYK colors CMYK 2 or spot colors may be used. The print may be performed in high resolution and is optionally followed by a curing in a curing step C3. Such curing step may be a thermal cure or a UV cure.

In next step S5B, a second anti-abrasion layer 6B is formed by applying mineral particles, for example by scattering Alox (aluminiumoxide), by binder and powder jetting, or by using a piezo needle.

In a further step S6, as shown in FIG. 1, a microstructure and variable gloss are formed. This is realized by depositing clear coat material 7, optionally including a matting agent, in a step CC1, to form a clear coating layer 7A. The clear coating layer 7A may be performed in very high resolution, preferably 1200 dpi, and is followed by a curing step C4. Such curing step may be a thermal cure or a UV cure. Subsequently, a clear coat material, optionally including a matting agent, is deposited in a step CC2. The clear coating layer may be performed in very high resolution, preferably 1200 dpi, and is cured in a curing step C5. Such curing step may be a thermal cure, a UV cure or an excimer cure. Curing C4 and curing C5 are steps S6B. Matt/gloss may be obtained with various pinning and cure settings.

Where in the above binder and powder jetting is mentioned preferably a technique is meant in which a binder is printed in a pattern, a powder is deposited uniformly, the binder is cured, and the unbound powder is removed.

Figures 2A, 2B, 2C:
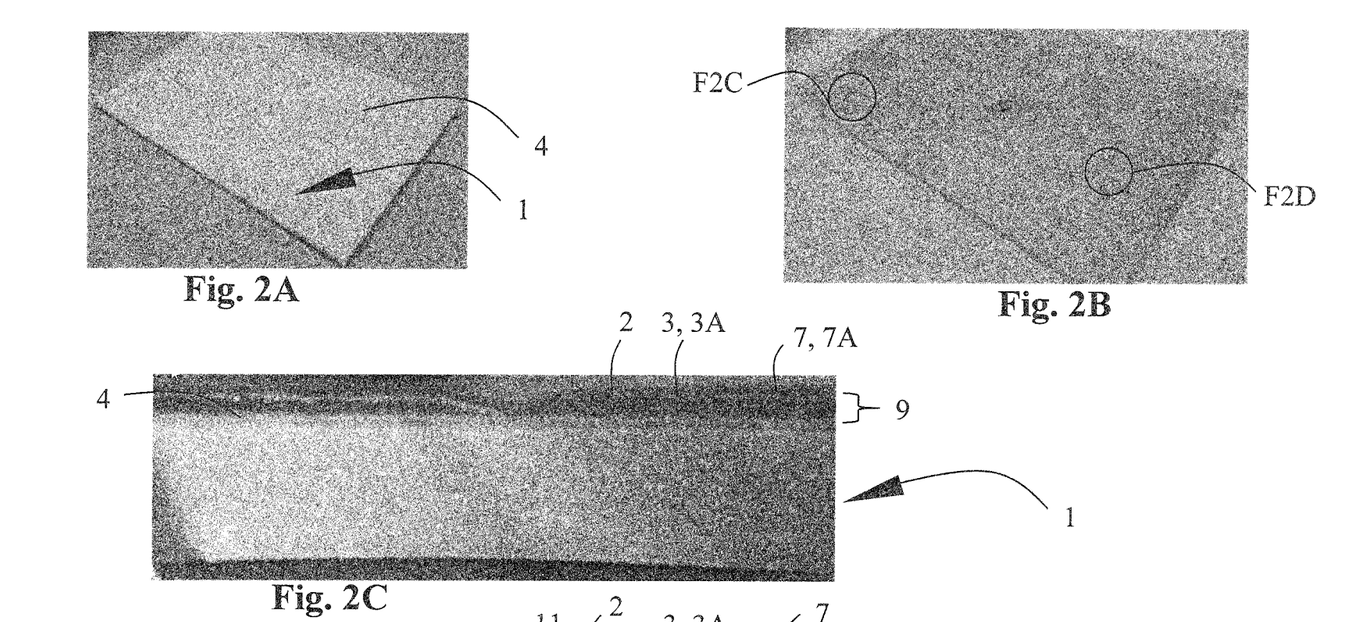
FIGS. 2A, 2B, 2C and 2D show some photographs of a decorative panel obtained with the method of FIG. 1.
Figure 2D:
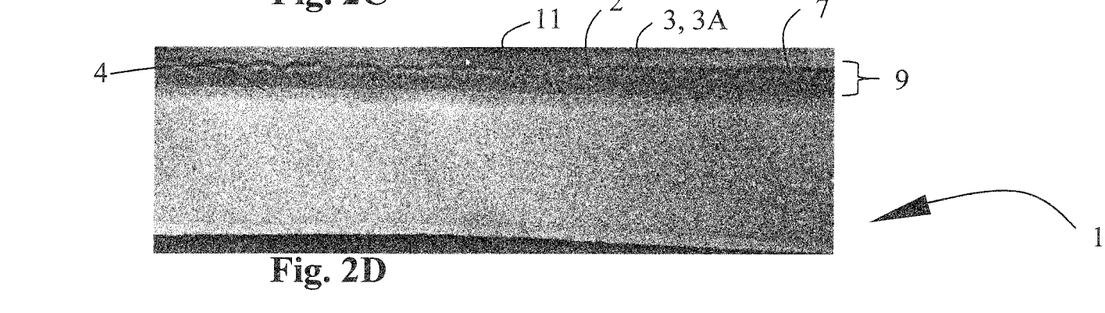

FIGS. 2A, 2B, 2C and 2D shows several views on the obtained decorative panel 8. FIG. 2A shows a substrate 1 with its substrate's surface 4. FIG. 2B shows a decorative panel 8 obtained with the method of FIG. 1. FIG. 2C shows a cross-section according to F2C, and shows the substrate 1, the substrate's surface 4, a relief forming material 2, a decor forming material 3, the second print layer 3A, clear coating material 7, and the clear coating layer 7A. Top layer 9 comprises the relief forming material 2, the decor forming material 3, the second print layer 3A, the clear coating material 7, and the clear coating layer 7A. FIG. 2D shows another cross-section, and shows the substrate 1, a relief forming material 2, and a decor forming material 3, the second print layer 3A, a clear coating material 7, the clear coating layer 7A, and a relief 11. Top layer 9 comprises the relief forming material 2, the decor forming material 3, the second print layer 3A, the clear coating material 7, and the clear coating layer 7A.

Figure 3:
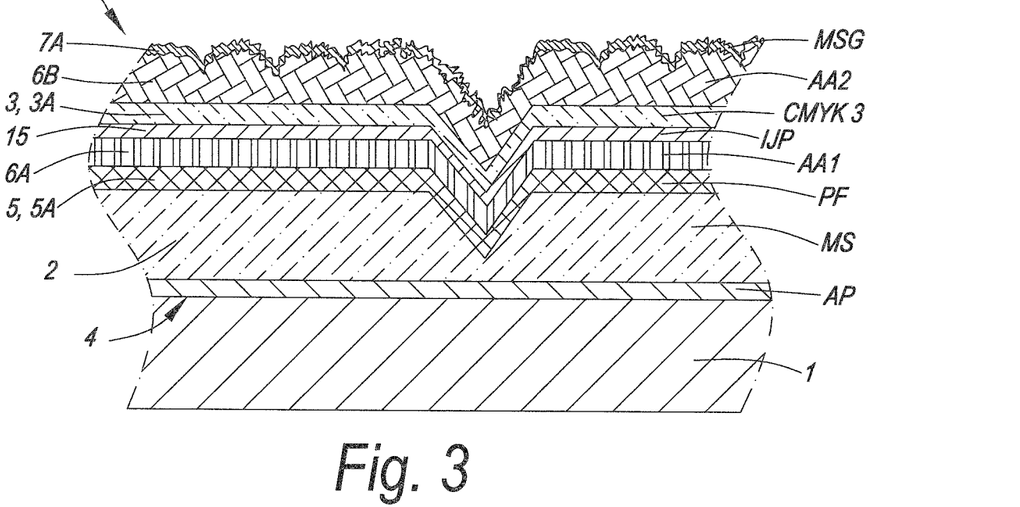
FIG. 3 schematically represents a decorative panel with a top decorative layer obtained through a method of the invention.

FIG. 3 shows a conceptual build-up of the top decorative layer 9. From bottom to top on the panel substrate material 1 may be applied:

An adhesion primer (AP). This may be applied by means of one or more rollers, or by means of a valvejet or other digital deposition device. Preferably a uniform coating is applied, preferably a coating extending over the entire surface 4, or substantially the entire surface 4 of the panel substrate material 1;

A digitally deposited structure, preferably macrostructure (MS), such as a relief forming material layer 2. The digitally deposited structure may be applied with a low resolution at high volume application rates. The applied material may be highly filled, for example with a filling rate of 40 weight percent or more. For the application low resolution piezo inkjetheads, pistons or a valvejet may be used. The thickness of this layer may be between 50 and 300 micrometer;

A preprint fond layer (PF), such as a background forming material 5 and a background forming material layer 5A. The preprint front layer seeks to add a uniform coloring or a low resolution print. The preprint front layer may be applied by means of low resolution piezo inkjetheads;

A first anti-abrasion layer (AA1) with hard particles 6A. The hard particles 6A may be applied with scattering, piezo needle or similar;

An inkjet primer 13 (IJP). An inkjet primer 13 may be applied with one or more rollers, with valvejet, by spraying or by curtain coating. Preferably a uniform coating is obtained;

A second print layer 3A, such as a CMYK high detailed inkjet print layer (CMYK 3). The second print layer 3A is preferably applied by using high resolution piezo inkjet heads and is preferably obtained from decor forming material 3;

A second anti-abrasion layer (AA2) with hard particles 6B, preferably including structure in itself. The second anti-abrasion layer may be applied by means of one or more rollers or by means of valvejet. Preferably a substantially uniform coating is obtained;

A clear coating layer 7A, such as a high detailed clear coating layer (MSG) which may have a mat and/or gloss microtexture. The clear coating layer 7A is preferably applied by means of a high resolution piezo inkjet head and is preferably obtained from clear coating material 7. The clear coating layer 7A may be applied in several steps with intermediate curing. Lacquers with various gloss levels may be applied one after the other. The intermediate curing steps may be executed using excimer curing and/or UV curing. Preferably for obtaining varying gloss levels, UV LED pinning is applied with various intensities and timing of pinning.

Figure 4:
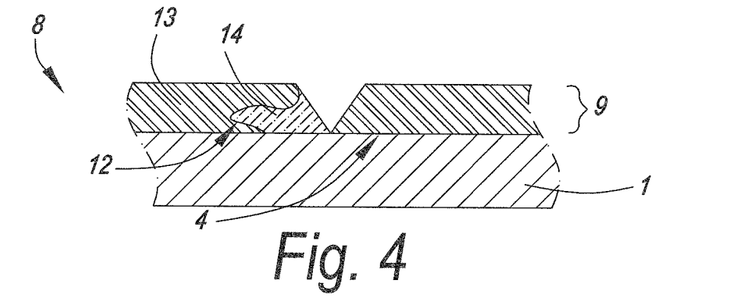
FIG. 4 schematically illustrates a second concept of the invention.

FIG. 4 shows that the method of the invention allows for creating a decorative panel 8 with a structure 11 having undercuts 12. This is obtained by depositing a removable, e.g. washable, solvable or meltable, support material 13 on the surface of the substrate 4, at the location where the undercut 12 is to be formed. The material 14 overhanging the undercut 12 is then first deposited and possibly cured. Afterward the support material 13 is removed actively by washing, solving or melting, or vanishes by itself for example because it degrades. Possible support materials 13 may be polyethyleneglycol-based (PEG), polyvinylalcohol-based (PVA) or wax-based. These materials may be jetted at 50 to 80° C., solidify on the panel substrate material 1 at room temperature (25° C. or below). The support material 13 may in such case be removed at 40 or 50° C. using a solvent such as water.

Figure 5:
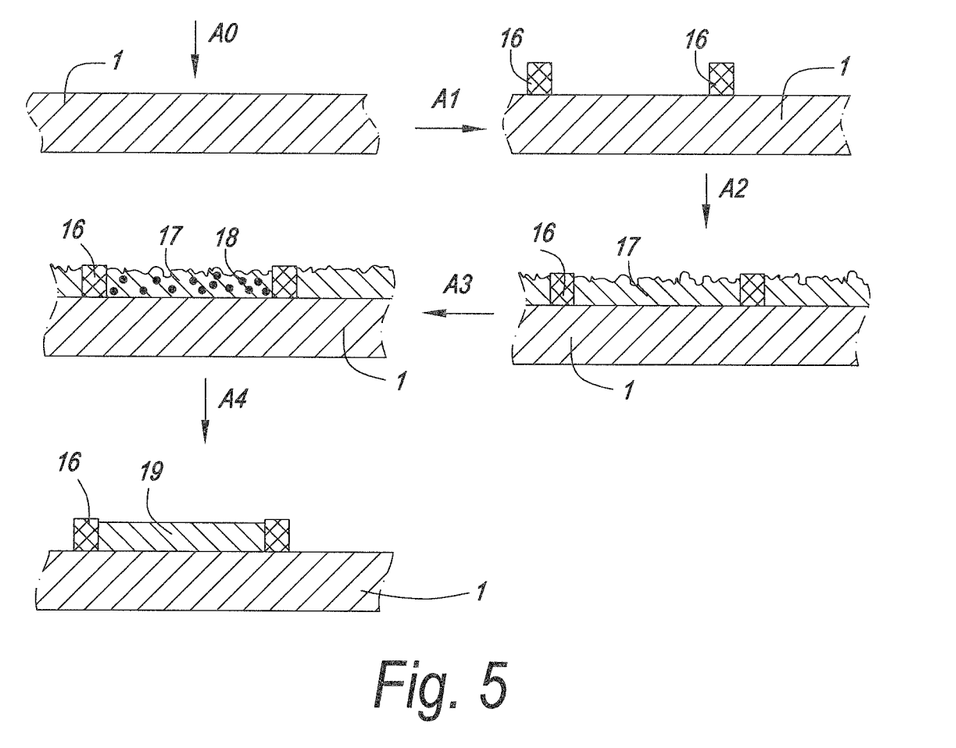
FIG. 5 schematically represents some steps in a method according to the invention for a potential product build-up.

FIG. 5 schematically represents possible steps in a method for manufacturing a decorative panel 8 according to the tenth aspect of the present invention. In a preliminary step A0, a panel substrate 1 is provided.

In a step A1 a contour forming material 16 is deposited on the panel substrate 1 by means of additive manufacturing, for example by means of material jetting. The contour forming material 16 at least partially defines the contours of one or more relieved features to be formed.

In a next step A2, filling-up material 17 is provided at least within one or more of the contours. In this case the filling-up material 17 is deposited within all contours. The filling-up material 17 is preferably deposited by means of traditional coating techniques, such as powder coating. The filling-up material 17 may comprise wood, cellulose of chalk.

In a next step A3 an adhesive 18 is applied within one more of the contours, in this case with all of the relevant filling-up material already present within the same contour. The adhesive 18 may be deposited by means of one or more additive manufacturing techniques, for example by jetting, such as material jetting.

In a further step A4, the adhesive 18 and the filling-up material 17 are cured and unbound or loose filling-up material is removed. The curing may be a thermal curing, a reactive curing or an UV curing. Upon curing, the adhesive 18 allows for mutual bonding of the filling-up material 17 to form a solid layer 19, and/or said adhesive 18 may allow for a bond being formed between said filling-up material 17 and said contour forming material 16, and/or between said filling-up material 17 and said panel substrate material 1.

Figure 6:
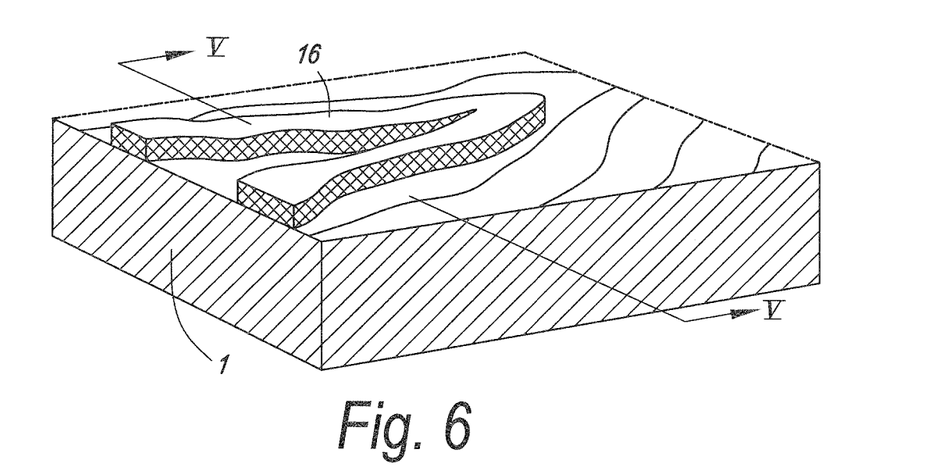
FIG. 6 schematically represents a view in perspective of the decorative panel after step A1 of the method of FIG. 5.

FIG. 6 shows a view in perspective of the decorative panel obtained by a method as described in FIG. 5, after step A1 of FIG. 5. Contour forming material 16 is deposited on the substrate 1 to form one or more contours.

Figure 7:
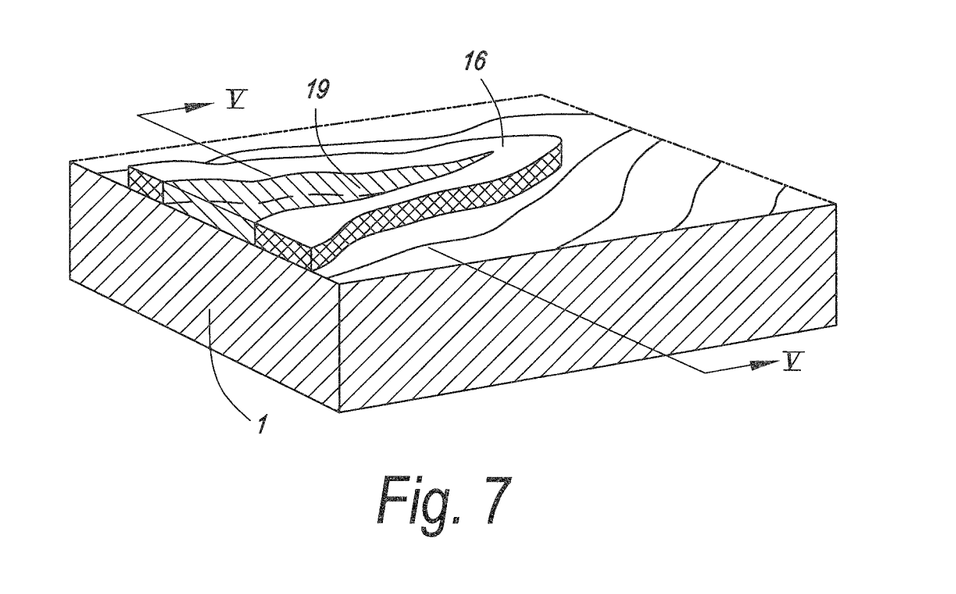
FIG. 7 schematically represents a view in perspective of the decorative panel after step A4 of the method of FIG. 5.

FIG. 7 shows a view in perspective of the decorative panel obtained by a method as described in FIG. 5, after step A4 of FIG. 5. Filling-up material 17 and an adhesive 18 have been cured and a solid layer 19 is formed within the contour, whereas outside of the contour any filling-up material that was deposited has been removed due to the absence of a curing.

Figure 8:
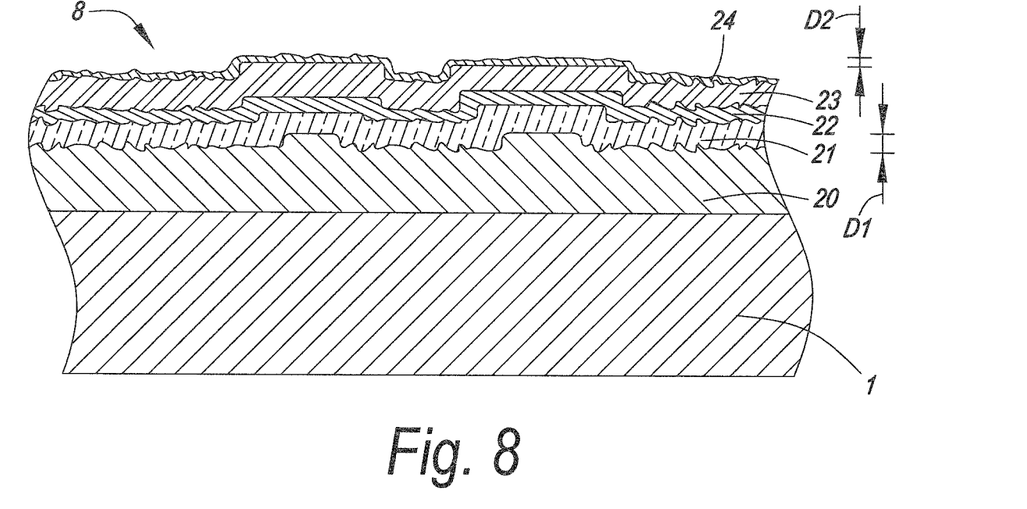
FIG. 8 schematically represents a decorative panel with a top decorative layer obtained through a method of the invention.

FIG. 8 shows the schematic representation of a decorative panel 8 with a top decorative layer obtained through a method according to the eleventh aspect of the invention. A first material layer 20 is deposited on the panel substrate material 1, preferably by means of one or more additive manufacturing techniques. On top of the first material layer 20, a first print layer 21 is deposited, using inkjet printing technology and CMYK inks. Next, an anti-abrasion layer 22 is deposited on top of the first print layer 21. On top of the anti-abrasion layer 22, a second print layer 23 is deposited, using inkjet printing technology and CMYK inks. In a further step, a second material layer 24 is deposited on top of the second print layer 23. The second material layer may be deposited by means of one or more additive manufacturing techniques, such as material jetting. The second material layer 24 may be a relief forming material whereby preferably the maximum depth of the relief features D2 in the second material layer is smaller than the maximum depth of the relief features D1 in the first material layer, i.e. the first material layer 20 represents a macrostructure and the second material layer 24 represents a microstructure.

Figure 9:
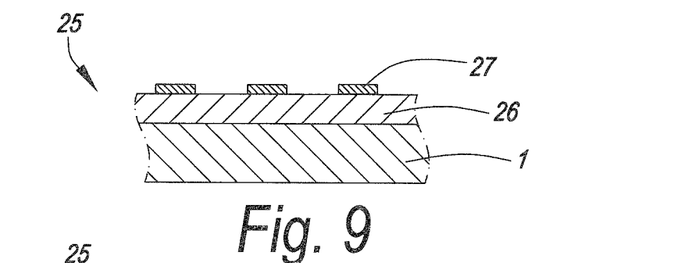
FIGS. 9, 10 and 11 schematically represents some steps in a method according to the invention for a potential product build-up.
Figure 10:
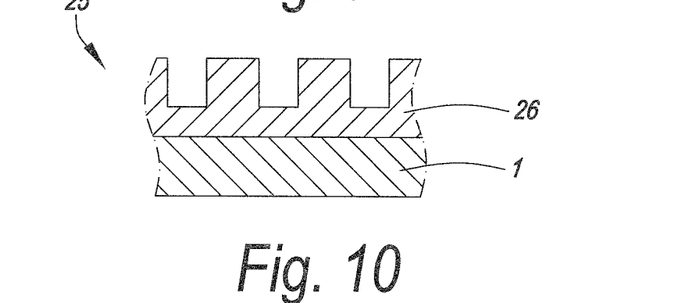
Figure 11:
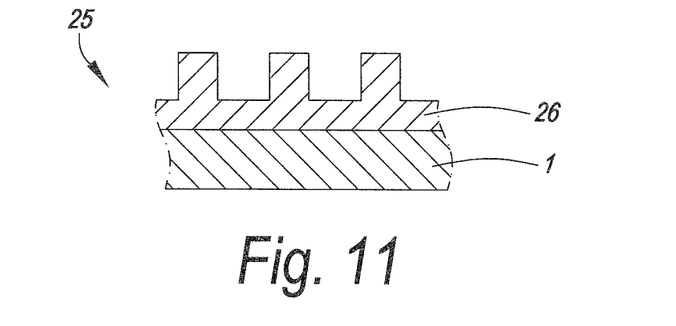

FIGS. 9, 10 and 11 show schematically some steps for a potential product build-up in a method according to the eleventh aspect of the present invention, wherein a macrostructure 25, for example a first material layer 20 of FIG. 8 or a relief forming material layer 2 of FIG. 3, is obtained.

A panel substrate 1 is provided. A foamable or expandable material 26 is deposited on the substrate surface 1. Preferably the foamable or expandable material 26 comprises at least one additive, such as a foaming agent, for example a blowing agent such as pentane. In a next step, an active agent 27 is deposited on the foamable or expandable material 26.

FIG. 8 shows the method wherein the active agent 27 is a foam inhibitor. In this case, upon activation of the foamable or expandable material 26 and its, preferably added, foaming agent, for example by exposure to heat, radiation and/or a laser, the active agent 27 prevents the foam formation and/or the expansion and, the optional curing at the places where the active agent 27 has been applied on the foamable or expandable material 26. On the other areas of the foamable or expandable material 26, where no active agent 27 has been applied, the foamable or expandable material 26 will foam or expand and, optionally, cure under the presence of heat and/or radiation.

FIG. 9 shows the method wherein the active agent 27 is a promotor, such as crosslinking agent or a photoinitiator. In this case, upon activation of the foamable or expandable material 26 and its, preferably added, foaming agent, for example by exposure to heat, radiation and/or a laser, the active agent 27 will allow and enhance the foam formation and/or the expansion and, the optional, curing at the places where the active agent 27 has been applied. On the other areas of the foamable or expandable material 26, where no active agent 27 has been applied, the foam formation, expansion and/or the optional curing is in this case prevented.

In a further process step, which is not shown, unreacted—unfoamed, non-expanded, or non-cured—foamable or expandable material 26 is removed, for example by suctioning, rinsing or brushing.

The present invention is in no way limited to the described and illustrated embodiments, but such methods and decorative panels may be realized in accordance with several variants without leaving the scope of the present invention.

The invention claimed is:
1. A method for manufacturing decorative panels, wherein the method comprises at least the following steps:
providing a panel substrate material;
depositing a relief forming material on the panel substrate material from a valvejet printer;

depositing a decor forming material on the panel substrate material from an inkjet printer;

wherein the relief forming material is different from the decor forming material;

wherein the decor forming material is a liquid ink;

wherein depositing relief forming material and depositing decor forming material are performed in a single movement of the panel substrate material relative to the valvejet printer and the inkjet printer in a single layer;

wherein said valvejet printer applies a spatially diversified amount of relief forming material to cover an entirety of a surface of the panel substrate material in a single pass;

wherein said valvejet printer deposits relief forming material at a resolution of below 100 dpi, while said inkjet printer deposits decor forming material at a resolution above 200 dpi;

wherein the method further comprises depositing a background forming material executed after depositing the relief forming material and before depositing the decor forming material;

wherein the background forming material is an ink.

2. The method for manufacturing decorative panels according to claim 1, wherein the method comprises depositing a clear coating material on the substrate material;

wherein said clear coating material is digitally applied with a resolution above 300 dpi.

3. The method in accordance with claim 2, wherein the method further comprises curing said clear coating material, wherein said curing is controlled digitally.

4. The method according to claim 3, wherein said digitally controlled curing comprises applying different pinning and cure settings to said clear coating material.

5. The method according to claim 1, wherein said panel substrate material comprises a uniformly colored top surface.

6. The method according to claim 1, wherein said panel substrate material comprises a structured top surface.

7. The method according to claim 1, wherein the relief forming material is applied which comprises a polymer filled with at least 30 wt % of filler materials.

8. The method according to claim 1, wherein the liquid ink is selected from an inkset comprising cyan magenta yellow and key/black inks.

9. The method according to claim 1, wherein the relief forming material is a polymeric material, the polymeric material of the relief forming material selected from the group consisting of polyurethane, polyvinylchloride, polyethylene, polyethyleneterephthalate, polypropylene, acrylonytril butadiene styrene, nylon, polytetrafluoroethylene and polyacrylate.

10. The method of claim 9, wherein the polymeric material of the relief forming material is filled with at least 30 wt % of filler materials, said filler material has a particle size larger than 10 micrometers.

11. The method of claim 10, wherein the filler materials are selected from the group consisting of sand, chalk and talcum.

12. The method according to claim 1, wherein nozzles of the valvejet printer are located a larger distance from the surface of the panel substrate material than nozzles of the inkjet printer.

13. The method according to claim 1, wherein the valvejet printer deposits the relief forming material on the panel substrate material before the inkjet printer deposits the decor forming material over the relief forming material.

14. The method according to claim 1, wherein the valvejet printer has a width to deposit the relief-forming material over an entire width of the surface of the panel substrate material.

15. The method according to claim 1, wherein the valvejet printer extends transversely over a path of the panel substrate material.

16. The method according to claim 1 further comprising the step of depositing hard particles on the background forming material.

17. The method according to claim 1, wherein a thickness of the deposited relief forming material is at least 250 micrometers.

18. The method according to claim 1, wherein the ink is a water based ink.

* * * * *